Figure 1:
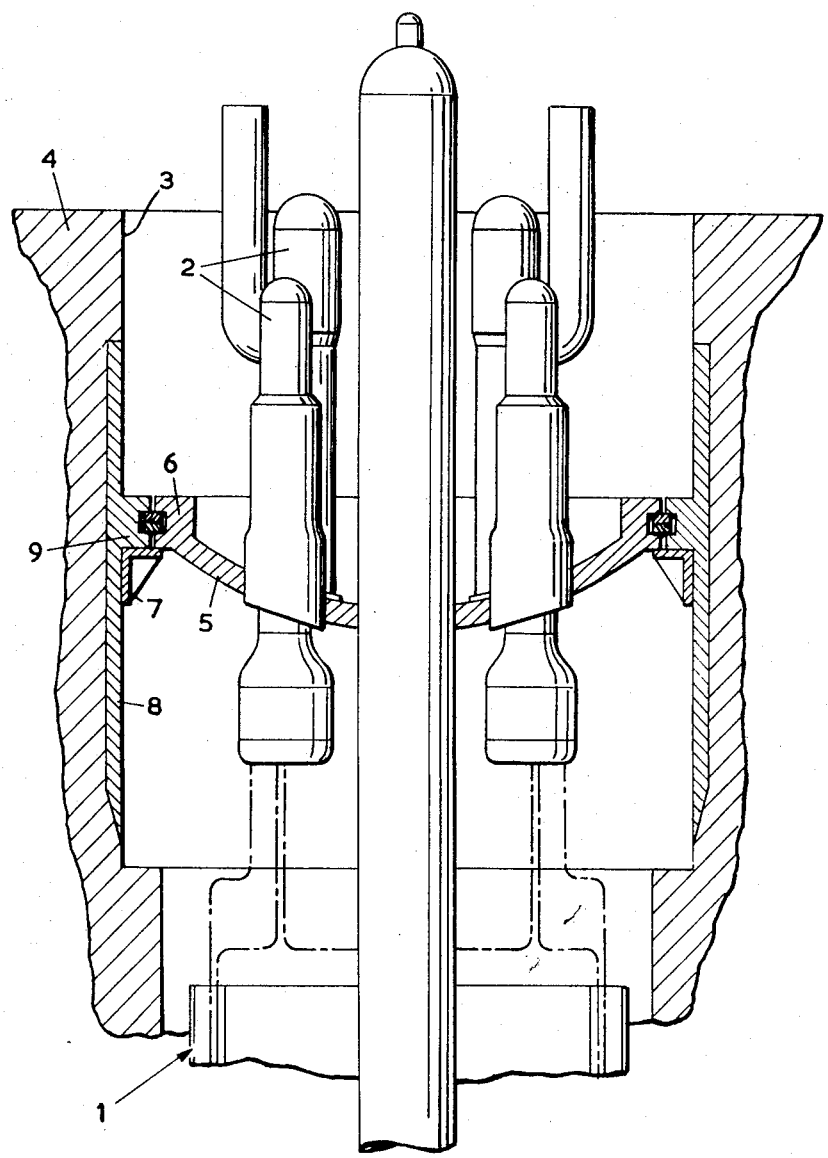

United States Patent [19]

Charcharos

[11] 3,718,353
[45] Feb. 27, 1973

[54] SUPPORT ARRANGEMENT

[75] Inventor: Anthreas Nicholas Charcharos, Whetstone, Leicestershire, England

[73] Assignee: British Nuclear Design and Construction Limited, Leicestershire, England

[22] Filed: Oct. 23, 1968

[21] Appl. No.: 769,957

[30] Foreign Application Priority Data

Nov. 16, 1967 Great Britain..................52,180/67

[52] U.S. Cl..............................287/20.3, 285/18
[51] Int. Cl...........................................F16b 9/00
[58] Field of Search........285/18, 421, 141, 415, 411, 285/321; 287/20.3, DIG. 7

[56] References Cited

UNITED STATES PATENTS

| | | | |
|---|---|---|---|
| 2,297,139 | 9/1942 | Flachbarth | 287/20.3 X |
| 3,228,715 | 11/1966 | Neilon et al. | 285/313 |
| 3,321,217 | 5/1967 | Ahlstone | 285/421 X |
| 3,338,596 | 8/1967 | Knox | 285/141 X |
| 3,345,087 | 10/1967 | Hanes et al. | 285/321 |

FOREIGN PATENTS OR APPLICATIONS 730,339   5/1955   Great Britain.................285/321

Primary Examiner—Andrew V. Kundrat
Attorney—Stevens, Davis, Miller & Mosher

[57] ABSTRACT

The invention provides a support arrangement for locating boiler or other service units in vertical bores in the pressure vessel wall of a nuclear reactor. The arrangement comprises two co-operating flanges (6) and (9) provided with grooves (10) and (11) respectively which are brought into alignment. The groove (10) houses pairs of wedge member segments (12), (13), which are moved radially outwardly of their groove by jacking screws (14) to a wedging position. Such an arrangement permits sealing between the unit and bore to be effected from the mouth end of the bore, thus permitting the seal to be readily renewed or serviced.

2 Claims, 2 Drawing Figures

SUPPORT ARRANGEMENT

This invention relates to support arrangements.

According to this invention, a support arrangement for mounting a unit in a bore comprises co-operating grooves in the unit and the bore, a pair of wedge members associated with one of said grooves, and means for moving the wedge members to a locking position in which they project into the other groove, the arrangement being such that, in their locked position, the wedge members co-act to wedge against the sides of the co-operating grooves so as to prevent relative axial movement between the unit and the bore.

Preferably, the bore is circular and said grooves are provided in co-operating flanges for the unit and bore respectively, the flange for the unit fitting within the flange for the bore, and a plurality of pairs of wedge members in the form of segments are disposed within said one groove.

Conveniently a sealing ring may be provided, the dimensions of which are chosen such that it seals across any space left between said co-operating flanges.

The invention has application, for example, in a fluid-cooled nuclear reactor in which boiler units or other mechanical equipment, e.g., coolant circulators and service facility units, are mounted in bores extending through the pressure vessel wall of the reactor. In such an application it is essential to ensure that coolant gas cannot leak from these bores, and a support arrangement according to the invention enables sealing to be achieved between a bore and its unit after the latter has been mounted in the bore, and hence the sealing device may be replaced when required without the need to withdraw the unit from its bore.

Figure 2:
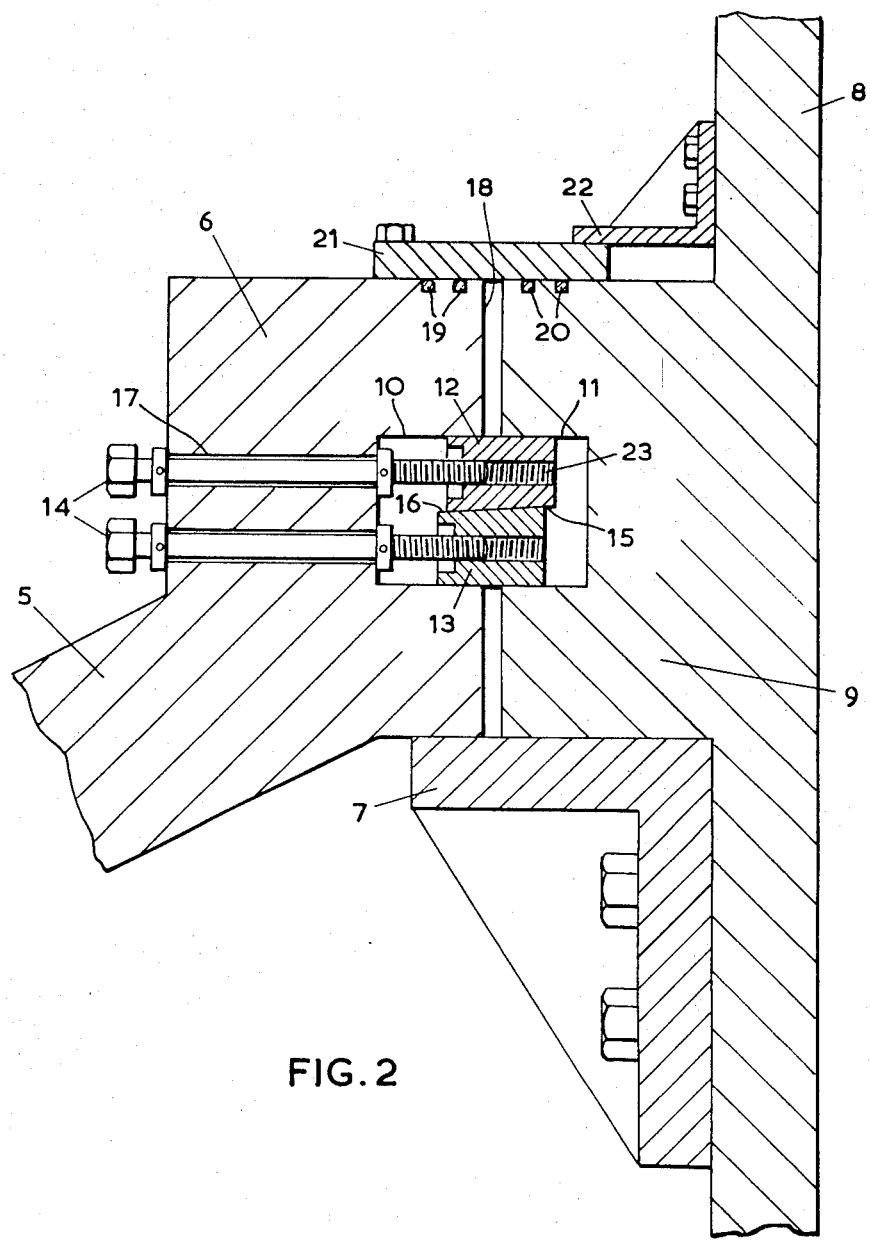

In order that the invention may be readily understood and further features made apparent, a support arrangement in accordance with the invention as applied to a boiler unit for a gas-cooled nuclear reactor will now be described by way of example with reference to the accompanying drawings, in which:

FIG. 1 is a diagrammatic part-sectional elevation of the boiler unit in its supported position, and FIG. 2 is an enlarged sectional elevation of the locking mechanism of the support arrangement.

Referring to the drawings, the boiler unit 1 provided with head nozzles 2 is adapted for location in a vertical circular bore 3 in the wall 4 of the pressure vessel for the nuclear reactor. A number of vertical bores 3 may be disposed around the pressure vessel wall for accommodating other boiler units and/or other service facility units for the nuclear reactor, the shapes and dimensions of these bores being chosen to suit said units.

The boiler unit 1 is supported on a circular plate 5, which is part-spherical in cross-section via an annular support flange 6 to which the plate 5 is welded. When the unit 1 is in its located position within the bore 3, the flange 6 seats on a plurality of support brackets 7 which are attached to a cylindrical metal liner 8 which is a close fit within the bore 3. The liner 8 is provided with an inwardly-directed flange 9 immediately above the level of the support bracket 7 and the internal diameter of this flange is such that it closely embraces the flange 6 of the boiler unit 1. The flanges 6 and 9 are provided with co-operating peripheral grooves 10 and 11 respectively (see FIG. 2), and the groove 10 has pairs of wedge members in the form of ring segments 12, 13 associated therewith. The ring segments 12, 13 are located one above the other in the groove 10 and have co-operating inclined faces 15 and 16 respectively. Each ring segment is provided with one or more jacking screws 14, each of which extends in a horizontal plane through an aperture 17 in the flange 6 and into a screwed bore 23 of its respective ring segment.

Thus, in order to locate the boiler unit 1 in the bore 3, the unit is lowered into the bore until the flange 6 seats on the support brackets 7, thus bringing the flanges 6 and 9 and their respective grooves 10 and 11 into alignment. The ring segments 13 are then moved outwardly from their groove 10 by the jacking screws 14 to a position in which they extend across the space 18 between the flanges. The ring segments 12 are then similarly moved by their jacking screws 14 across the space 18 and the co-operating inclined faces 15, 16 of the ring segments cause the latter to wedge against their respective side walls of the grooves 10 and 11. Thus, by this arrangement relative axial movement between the flanges 6 and 9 is prevented and wedging action of the ring segments 12 and 13 allows for any slight misalignment and machining inaccuracies of said flanges and their respective grooves. However, it will be appreciated that the outward forces applied by the ring segments 12 and 13 against their respective walls of the grooves 10 and 11, may be chosen such that the ring segments provide only a limited restraint against relative movement between the flanges 6 and 9 in the horizontal plane. Thus, any relative movement between the boiler unit 1 and the bore 3 may be accommodated within the dimensions of the annular space 18 between the flanges 6 and 9. The space 18 between the flanges 6 and 9 is conveniently sealed against gas leakage by locating one or more O-rings 19, 20 respectively in annular groove provided in the top faces of the flanges 6 and 9, and by locating an annular sealing plate 21 on these O-rings. The plate 21 may be held in engagement with the O-rings by any suitable means, and in this particular embodiment this is achieved by a number of further support brackets 22 attached to and spaced around the liner 8.

An advantage of the support arrangement described above is that the sealing against gas leakage is provided above the level of the co-operating flanges 6 and 9, and hence if the O-rings require replacement during the life of the plant this may be conveniently achieved merely by lifting the sealing plate 21. In the past it has been proposed merely to seat the boiler unit flange 6 on the co-operating flange 9 of the liner 8, and to secure the flanges together by studs carried by and spaced around the flange 9 which pass through correspondingly spaced holes through the flange 6. The disadvantage of this arrangement is that the sealing against gas leakage needs to be provided between the flanges and hence, if these seals require replacement, the boiler unit 1 needs to be completely withdrawn from its bore 3.

I claim:

1. A support arrangement for mounting a unit on wall means defining a bore, wherein the improvement comprises;

the unit and said wall means each defining a cooperating groove;

wedge shaped members disposed initially in one of the grooves and comprising two cooperating slidably overlapped segmental rings which can be moved radially relative to each other so as to react against each other and take up a tight fit within the grooves;

means for moving the wedge members partially out of said one groove so as to engage the other groove to provide axial location between the unit and said wall means while permitting relative radial movement therebetween; and sealing means for providing a fluid-tight seal between the unit and said bore, the sealing means being disposed with respect to the wedge members so as to be replaceable without moving the wedge members.

2. A support arrangement according to claim 1, wherein the sealing means comprises resilient O-section rings, the unit and said wall means each having defined in adjacent, co-planar, radial surfaces associated therewith, at least one channel in which a ring is disposed, there being provided a detachable annular cover plate which is pressed into sealing engagement with the rings.

* * * * *